(12) United States Patent
Kovacik et al.

(10) Patent No.: US 10,494,950 B2
(45) Date of Patent: Dec. 3, 2019

(54) BEARING CENTERING SPRING

(71) Applicant: United Technologies Corporation, Farmington, CT (US)

(72) Inventors: Ronnie K. Kovacik, Manchester, CT (US); Kevin Duffy, Hartford, CT (US)

(73) Assignee: United Technologies Corporation, Farmington, CT (US)

(*) Notice: Subject to any disclaimer, the term of this patent is extended or adjusted under 35 U.S.C. 154(b) by 0 days.

(21) Appl. No.: 15/852,380

(22) Filed: Dec. 22, 2017

(65) Prior Publication Data

US 2019/0195089 A1 Jun. 27, 2019

(51) Int. Cl.
*F16C 27/00* (2006.01)
*F01D 25/16* (2006.01)
*F16C 35/04* (2006.01)
*F16F 15/121* (2006.01)
*F16F 1/04* (2006.01)
*F16F 1/10* (2006.01)

(52) U.S. Cl.
CPC ........... *F01D 25/164* (2013.01); *F16C 27/00* (2013.01); *F16C 35/04* (2013.01); *F16F 1/042* (2013.01); *F16F 1/10* (2013.01); *F16F 15/1213* (2013.01); *F05D 2220/32* (2013.01); *F05D 2240/60* (2013.01); *F16C 2360/23* (2013.01)

(58) Field of Classification Search
CPC ...... F16C 35/04; F16C 27/045; F01D 25/164; F05D 2220/32; F05D 2240/60
See application file for complete search history.

(56) References Cited

U.S. PATENT DOCUMENTS

| 1,526,709 | A | * | 2/1925 | Keyser | D01H 7/047 242/597.6 |
|---|---|---|---|---|---|
| 2,149,728 | A | * | 3/1939 | Cronan | F16C 27/02 384/192 |
| 2,487,343 | A | * | 11/1949 | Kopf | B04B 9/12 384/535 |
| 2,556,317 | A | * | 6/1951 | Cook | B04B 9/12 384/535 |
| 3,186,779 | A | * | 6/1965 | Chapman | F01D 25/164 384/535 |
| 3,208,303 | A | | 9/1965 | Durouchoux | |
| 3,485,540 | A | | 12/1969 | Nogle | |
| 4,699,528 | A | * | 10/1987 | Gotman | F16C 23/08 384/518 |
| 4,872,767 | A | | 10/1989 | Knapp | |
| 4,992,024 | A | | 2/1991 | Heydrich | |

(Continued)

FOREIGN PATENT DOCUMENTS

GB 2112084 A 7/1983

OTHER PUBLICATIONS

EP search report for EP18214952.6 dated Apr. 24, 2019.

*Primary Examiner* — Thomas R Hannon
(74) *Attorney, Agent, or Firm* — O'Shea Getz P.C.

(57) ABSTRACT

A bearing support assembly includes a bearing assembly, a housing, and a centering spring. The centering spring is coupled to the bearing assembly and the housing. The centering spring includes a plurality of spiral beams. A first of the plurality of spiral beams is defined by a first end and a second end. The first end and the second end correspond to a first circumferential location that is defined relative to a longitudinal centerline of the bearing support assembly.

14 Claims, 8 Drawing Sheets

(56) References Cited

U.S. PATENT DOCUMENTS

| | | | | |
|---|---|---|---|---|
| 5,800,070 | A | * | 9/1998 | Nilsson ................... B04B 9/12 384/535 |
| 7,857,519 | B2 | * | 12/2010 | Kostka ................. F01D 25/164 384/535 |
| 8,322,038 | B1 | * | 12/2012 | Heidari .................... F02C 7/06 29/898 |
| 9,322,292 | B2 | | 4/2016 | Berhan |
| 9,482,274 | B2 | | 11/2016 | Ertas et al. |
| 2009/0263057 | A1 | * | 10/2009 | Kanki ..................... B23H 9/00 384/99 |
| 2009/0282679 | A1 | | 11/2009 | Mons et al. |
| 2015/0198044 | A1 | | 7/2015 | Jung |
| 2017/0276173 | A1 | | 9/2017 | Smedresman et al. |

\* cited by examiner

BEARING CENTERING SPRING

BACKGROUND

Engines, such as those which power aircraft and industrial equipment, employ a compressor to compress air that is drawn into the engine and a turbine to capture energy associated with a combustion of a fuel-air mixture. Bearing support assemblies are used to support engine hardware. For example, and referring to FIG. 2, a bearing support assembly 200 in accordance with the prior art is shown. The bearing support assembly 200 includes a bearing centering spring/squirrel cage (illustrated via a centering spring beam 212), a stationary housing 214, and a bearing assembly 216. The centering spring beam 212 is defined by/between a first end 218 and a second end 220. The first end 218 includes a mounting flange 224 that is held in mated assembly with the housing 214. The bearing assembly 216 includes a bearing element 234, a first (e.g., inner) ring 236, and a second (e.g., outer) ring 238. A bearing assembly may be a roller bearing, ball bearing or some other type of bearing. The second end 220 of the centering spring beam 212 is coupled to the outer ring 238. The bearing support assembly 200 is shown defined about a longitudinal centerline 250. The centerline 250 may coincide with an engine axial centerline.

While a single centering spring beam 212 is shown in FIG. 2, conventionally a number of centering spring beams are replicated/distributed around the circumference of the centering spring. For example, approximately thirty centering spring beams may be used in some engines. The bearing support assembly 200 (in particular, the centering spring) is used to isolate vibration. For example, vibration that may be caused by rotation of engine hardware may be isolated by the centering spring; the centering spring may bend/deflect in response to loads experienced by the bearing assembly 216. Additionally, the centering spring may be used to accommodate rotor-dynamics; e.g., a stiffness of the centering spring may be customized/tailored to satisfy engine design requirements/criteria. A beam of the centering spring (see, e.g., FIG. 3B: beams 212a-212e) is oriented in a single direction (e.g., conventionally, parallel to an engine longitudinal axis/centerline).

For a given engine load/deflection, the amount of stress imposed on the centering spring beam 212 is related to a length of the centering spring beam 212. For example, all other conditions/parameters being equal, a second centering spring beam that is longer than a first baseline/reference centering spring beam will have less stress imposed on it than the first centering spring beam. Thus, from a stress perspective (which may be related to a lifetime of the centering spring beam—e.g., a reduction in stress imposed on the centering spring beam increases an operational lifetime of the centering spring beam), it is desirable to have as long a centering spring beam as possible. However, all other conditions/parameters being equal, longer centering spring beams are heavier (which may reduce engine efficiency) and consume more space (where space may be limited); thus, in some respects, it is desirable to have as short a centering spring beam as possible. Thus, using conventional centering spring beams a trade-off must be made in terms of stress/lifetime on the one hand and weight/efficiency and space on the other hand.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a bearing support assembly comprising: a bearing assembly, a housing, and a centering spring coupled to the bearing assembly and the housing, where the centering spring includes at least one spiral beam. In some embodiments, the at least one beam includes a plurality of loops. In some embodiments, the centering spring includes a plurality of spiral beams. In some embodiments, the plurality of spiral beams include at least three spiral beams. In some embodiments, a first of the plurality of spiral beams is defined by a first end and a second end, and a second of the plurality of spiral beams is defined by a third end and a fourth end. In some embodiments, the first end and the second end correspond to a first circumferential location that is defined relative to a longitudinal centerline of the bearing support assembly. In some embodiments, the third end and the fourth end correspond to a second circumferential location that is defined relative to the longitudinal centerline of the bearing support assembly. In some embodiments, the first circumferential location is offset from the second circumferential location.

Aspects of the disclosure are directed to a gas turbine engine comprising: a rotatable shaft, and a bearing support assembly coupled to the shaft, the bearing support assembly including a bearing assembly, a housing, and a centering spring coupled to the bearing assembly and the housing, where the centering spring includes a plurality of beams, and where a first of the plurality of beams is spiral-shaped. In some embodiments, each of the plurality of beams is spiral-shaped. In some embodiments, the bearing support assembly is defined about a longitudinal centerline, and the first of the plurality of beams is defined by a first end and a second end, and the first end and the second end correspond to a first circumferential location that is defined relative to the longitudinal centerline. In some embodiments, a second of the plurality of beams is defined by a third end and a fourth end, and the third end and the fourth end correspond to a second circumferential location that is defined relative to the longitudinal centerline. In some embodiments, a third of the plurality of beams is defined by a fifth end and a sixth end, and the fifth end and the sixth end correspond to a third circumferential location that is defined relative to the longitudinal centerline. In some embodiments, the first circumferential location, the second circumferential location, and the third circumferential location are different circumferential locations. In some embodiments, the first circumferential location is offset from the second circumferential location by one-hundred twenty degrees, and the second circumferential location is offset from the third circumferential location by one-hundred twenty degrees, and the third circumferential location is offset from the first circumferential location by one-hundred twenty degrees. In some embodiments, the first end corresponds to a first axial location relative to the longitudinal centerline, and the second end corresponds to a second axial location relative to the longitudinal centerline that is different from the first axial location. In some embodiments, a second of the plurality of beams is cylindrical in cross-section. In some embodiments, a second of the plurality of beams is rectangular in cross-section.

BRIEF DESCRIPTION OF THE DRAWINGS

The present disclosure is illustrated by way of example and not limited in the accompanying figures in which like FIG. 1 is a side cutaway illustration of a gas turbine engine.

DETAILED DESCRIPTION

Figure 1:
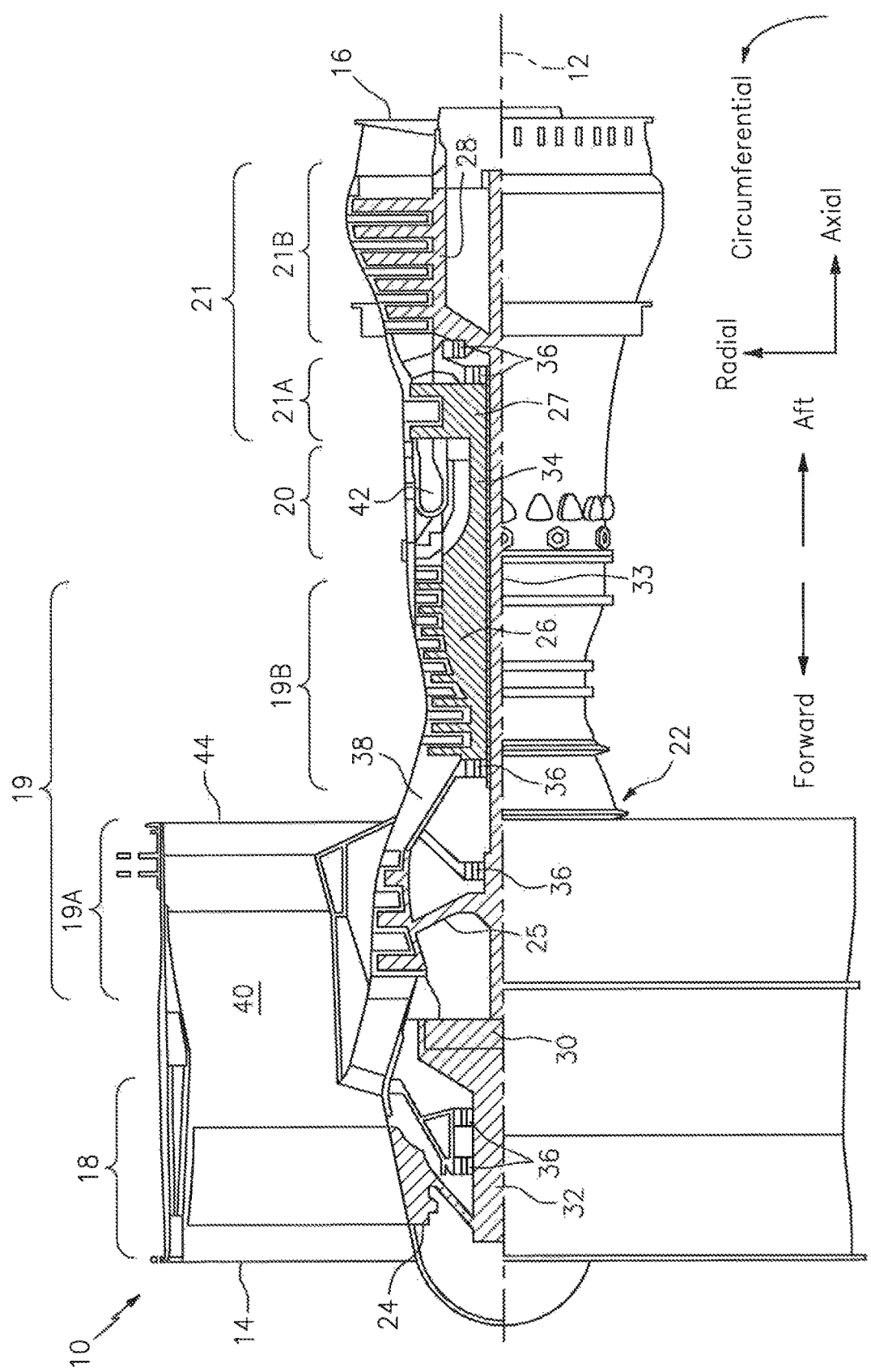

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems, and methods are described for incorporating a centering spring beam as part of a bearing support assembly for an engine. In some embodiments, a spiral shape/form-factor of a centering spring beam may enable a longer centering spring beam (and hence, a reduction in stress imposed on the centering spring beam for a given bearing deflection) without increasing a space (e.g., an axial length) consumed by the centering spring beam.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36 (e.g., rolling element and/or thrust bearings). Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration fir an engine 10. Aspects of the disclosure may be applied in connection with other environments, including additional configurations for gas turbine engines. Aspects of the disclosure may be applied in connection with non-geared engines.

Figure 2:
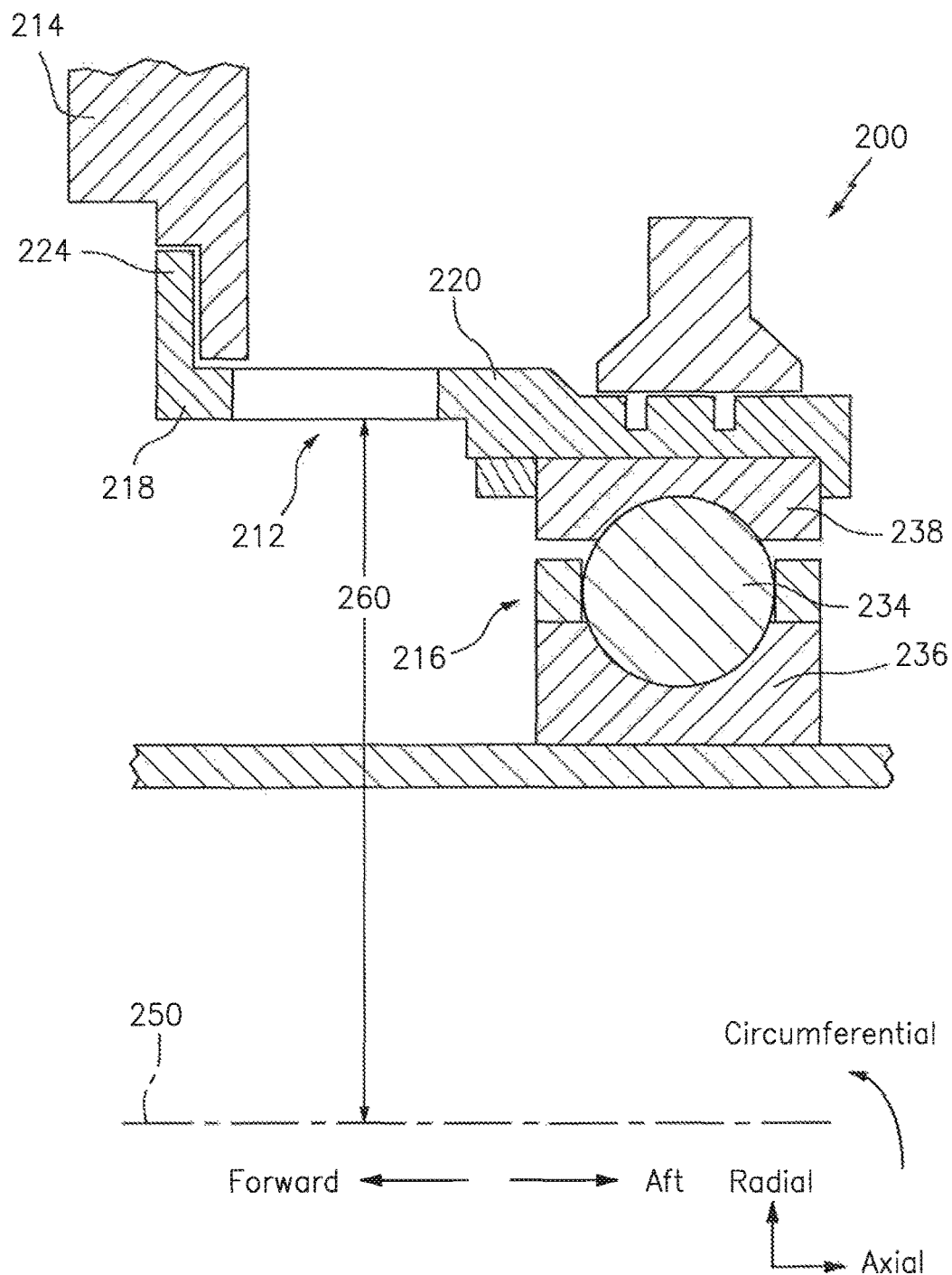
FIG. 2 illustrates a bearing support assembly in accordance with the prior art.
Figure 3:
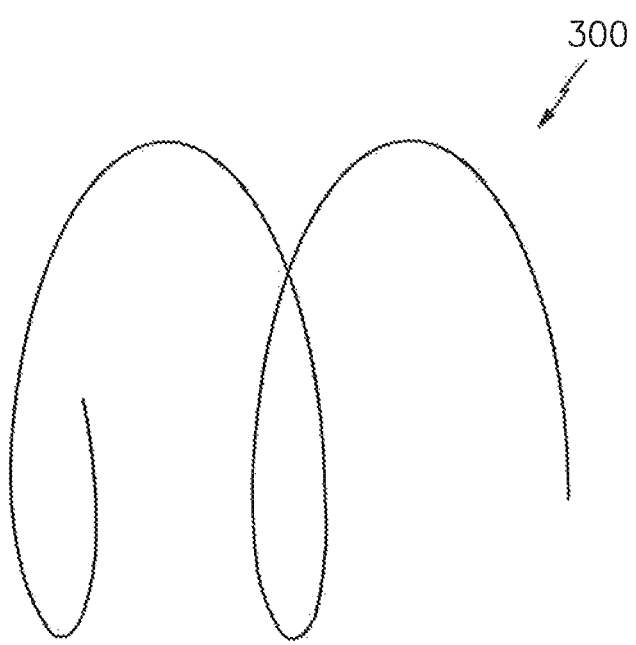
FIG. 3 illustrates a spiral centering spring that includes one beam.
Figure 3A:
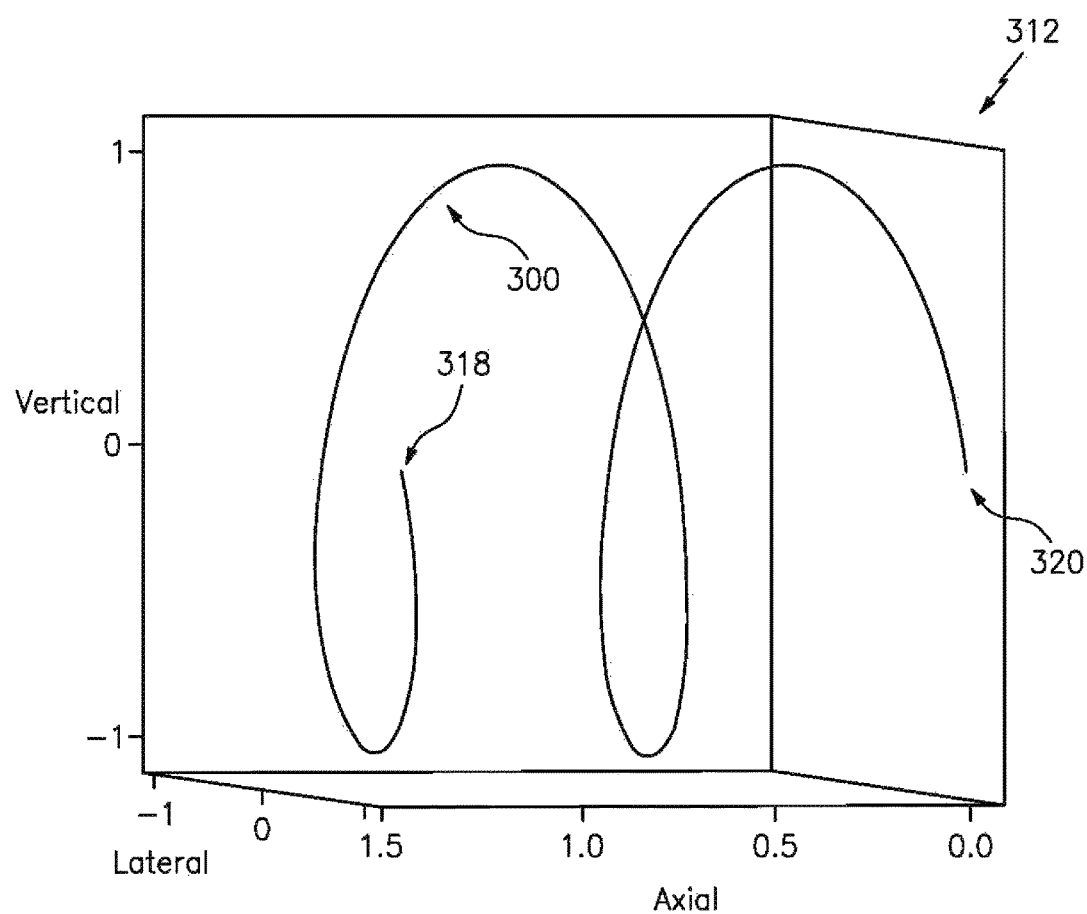
FIG. 3A illustrates a plot of a beam center position of the spiral centering spring beam of FIG. 3 in accordance with aspects of this disclosure.

FIG. 3 illustrates a spiral centering spring beam 300. Referring to FIG. 3A, a beam 312 of a centering spring beam (e.g., the centering spring beam 300 of FIG. 3) in accordance with aspects of this disclosure is shown. In particular, FIG. 3A illustrates a plot of a center position of the beam 312. As described herein, the beam 312 may have a spiral/coil-shaped profile. The beam 312 may be used as part of the centering spring beam 212 of FIG. 2. Stated differently, the beam 312 (or any of the other beams described herein) may be used as part of a centering spring beam that may be incorporated in conjunction with existing/legacy engine hardware. The beam 312 (or any of the other beams described herein) may form a spiral/coil-shaped centering spring beam.

As shown in FIG. 3A, the beam 312 may be defined by/between a first end 318 and a second end 320. The first end 318 may be coupled (e.g., attached) to a first structure (e.g., the housing 214 of FIG. 2). The second end 320 may be coupled (e.g., attached) to a second structure (e.g., the bearing assembly 216/outer ring 238 of FIG. 2).

The first end 318 may be axially distant/separated from the second end 320. For example, the first end 318 may be separated from the second end 320 by 1.5 axial units as shown in FIG. 3A (where the value of a unit may be based on the particular application environment/context where the beam 312 is used). This separation may correspond to the axial length of the beam/centering spring beam.

The beam 312 is shown as being defined substantially about a three-dimensional coordinate system. For example, axial, vertical, and lateral reference directions are superimposed in FIG. 3A.

The first end 318 and the second end 320 may correspond to the same lateral location/position. Having the first end 318 and the second end 320 correspond to the same lateral location/positon may help to avoid imposing a misalignment on a bearing assembly (e.g., bearing assembly 216 of FIG. 2). For example, a bearing assembly misalignment (e.g., a torqueing/twisting of the bearing assembly) could lead to a reduction in a lifetime/durability of the bearing assembly, such that it may be desirable to reduce the potential fix such misalignment.

The beam 312 may consume two units of vertical space/distance (e.g., between the value of 1 and −1) as shown in FIG. 3A. The value of 0 in the vertical reference direction in FIG. 3A may correspond to a centerline (e.g., engine centerline 12 of FIG. 1/centerline 250 of FIG. 2). In comparison, the distance 260 shown in FIG. 2 between the centerline 250 and the centering spring beam 212 may correspond to one unit. Due to the replication/distribution of the centering spring beams around the circumference of the engine as described above in conjunction with FIG. 2, the collective of the centering spring beams of FIG. 2 may consume two units of space. Thus, the beam 312 may provide for/enable a centering spring beam that consumes the same space/distance as that consumed by the centering spring beams described in conjunction with FIG. 2. Stated differently, the beam 312 may be used as part of a centering spring beam that fits within the same space/envelope as the centering spring beam(s) described above in conjunction with FIG. 2.

Figure 3B:
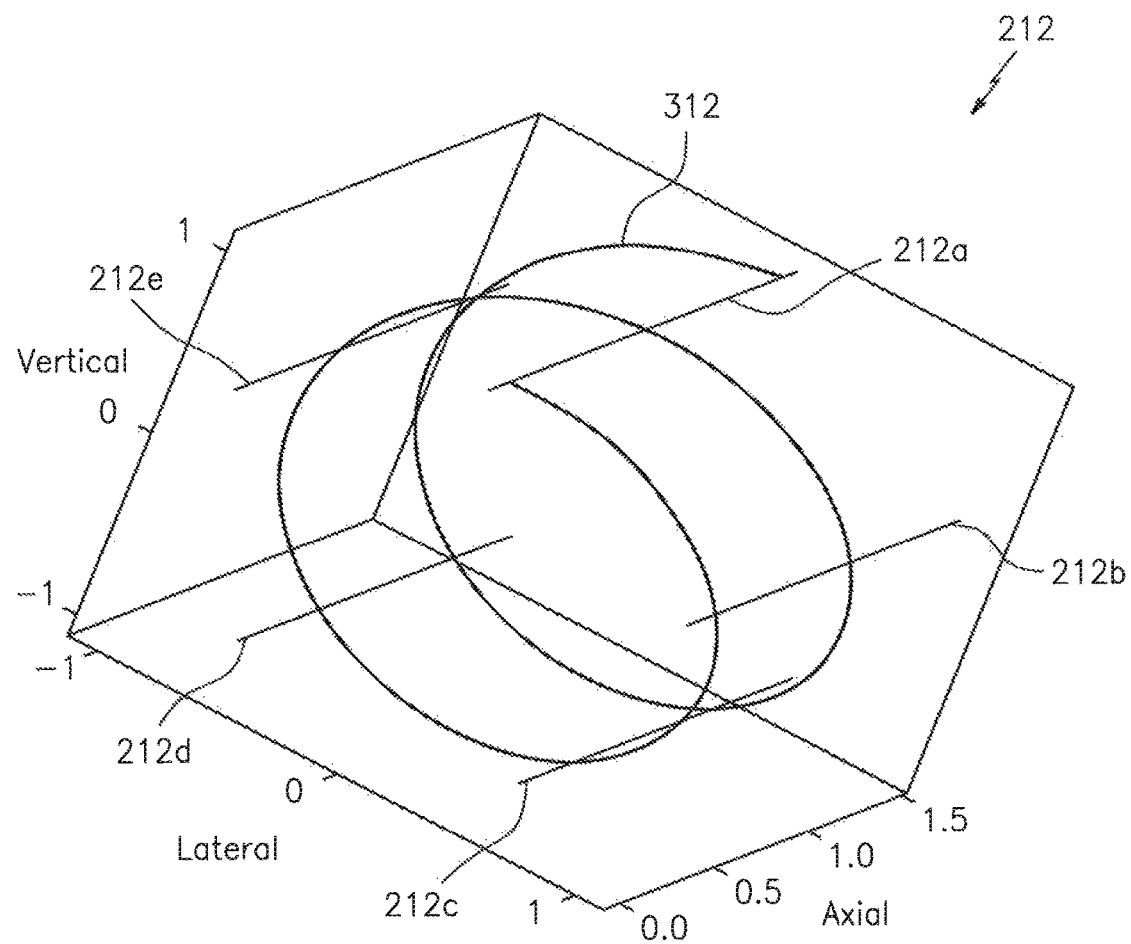
FIG. 3B illustrates the beam plot of FIG. 3A with a plot of axial beams of the prior art superimposed.

FIG. 3B illustrates a plot of the beam 312 of FIG. 3A superimposed relative to beams 212a-212e of the prior art. In particular, each of the beams 212a-212e is associated with a respective centering spring beam of the prior art (e.g., the centering spring beam 212 of FIG. 2). As shown in FIG. 3B, each of the beams 212a-212e is oriented in a single direction, e.g., the axial reference direction. In contrast, the beam 312 is oriented in the axial and lateral reference directions due to the spiral-shaped profile of the beam 312. Additionally, it is noted that FIG. 3B is a simplified diagram; for example, while five beams 212a-212e are shown, more than five beams (e.g., on the order of thirty beams, each beam corresponding to a centering spring beam) are frequently used in accordance with the prior art.

FIG. 3A (and FIG. 3B) illustrates the use of a single beam (e.g., beam 312) that may be used to form a centering spring in accordance with aspects of this disclosure. The centering spring may also include a plurality of beams 412. For example, FIG. 4 illustrates an embodiment where five spiral beams (e.g., the plurality of beams 412 including a first beam 412a, a second beam 412b, a third beam 412c, a fourth beam 412d, and a fifth beam 412e) may be included as part of a centering spring.

Much like the beam 312 of FIG. 3A, each of the beams 412a-412e may be defined by/between respective first and second ends, where the first and second ends of a respective beam may coincide with the same lateral location/position. The ends of a first of the beams (e.g., the first beam 412a) may be circumferentially offset from the other of the beams (e.g., the beams 412b-412e). The offset may be uniform/constant beam-to-beam. For example, given five beams each of the beams may be circumferentially offset from the next beam by seventy-two degrees (e.g. 360 degrees/5 beams=72). More generally, a uniform/constant offset may be calculated as 360 degrees divided by the number of beams, resulting in a value for a distance/angle 430 of offset between successive beams as shown in FIG. 4.

Figure 4:
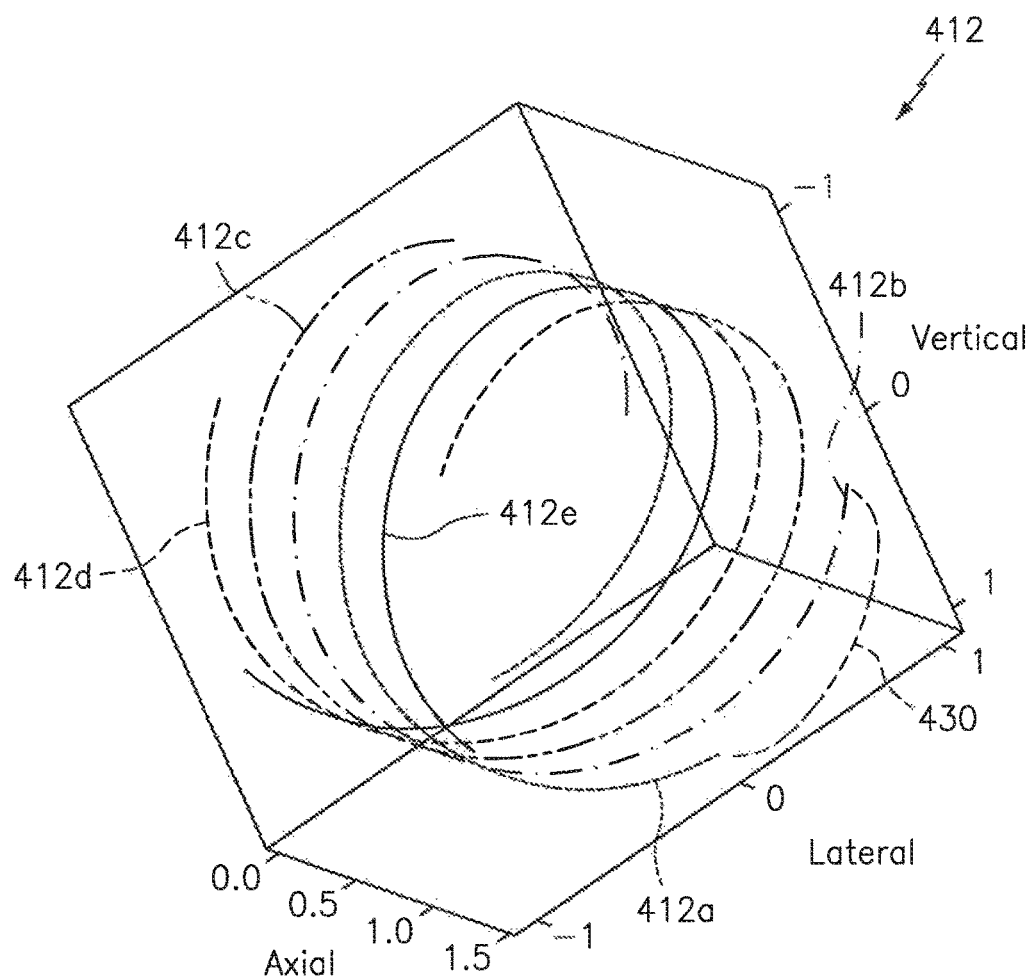
FIG. 4 illustrates a plot for a centering spring having a plurality of spiral beams in accordance with aspects of this disclosure.

A particular count/number of beams that are used may be a function of one or more requirements. Generally, an increase in the number of beams may enhance a stability of the centering spring system in which the beam(s) are incorporated. In some embodiments, at least three spiral/coil-shaped beams may be used. The use of more than three beams may further enhance stability, but diminishing returns may be obtained in terms of incremental stability that is obtained via the fourth beam (and any additional beams) relative to ease of manufacture/complexity in design.

in FIG. 3A, the beam 312 is shown as including two loops; in FIG. 4, each of the beams 412a-412e is shown as including a single loop. Generally, an increase in the number of loops of a beam increases the length of the beam (and hence, reduces stress that may be imposed on the beam). However, increasing the number of loops tends to increase an amount of space (e.g., axial length) that is consumed by the beam. Accordingly, a trade-off may be made between reducing stress on the one hand and reducing space on the other hand in terms of the count of loops that are used in a given beam. For a given amount of space, it may be desirable to increase (e.g., maximize) the count of loops.

Figure 5A:
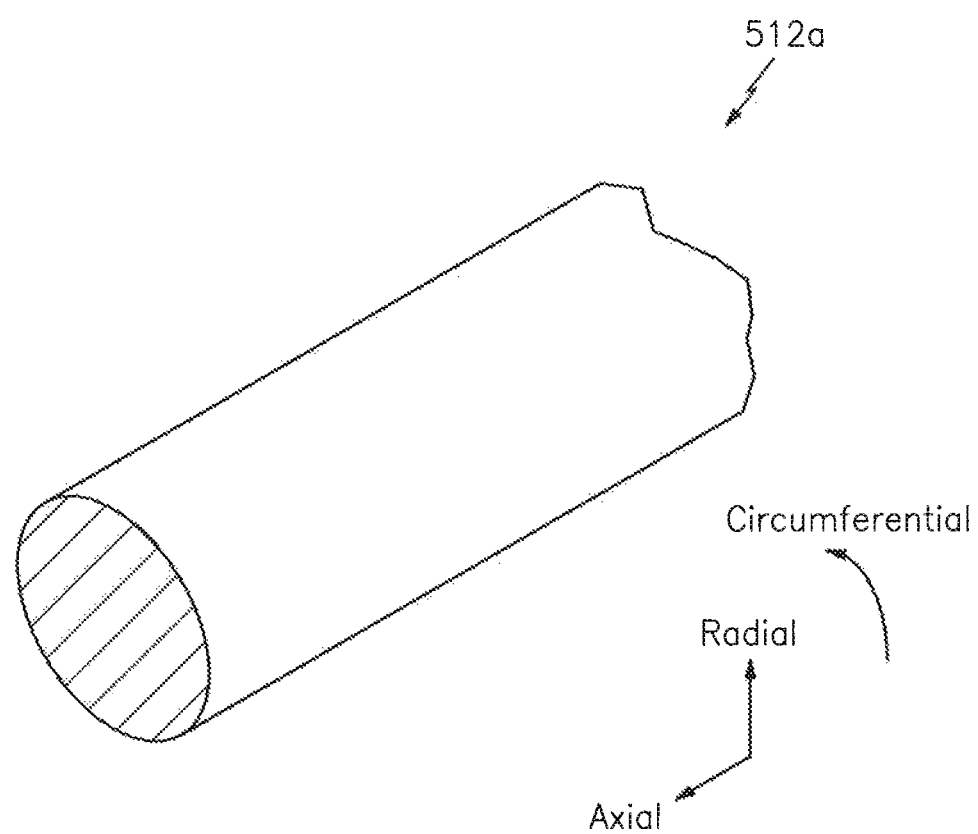
FIGS. 5A-5B illustrate cross-sectional profiles of a beam in accordance with aspects of this disclosure.
Figure 5B:
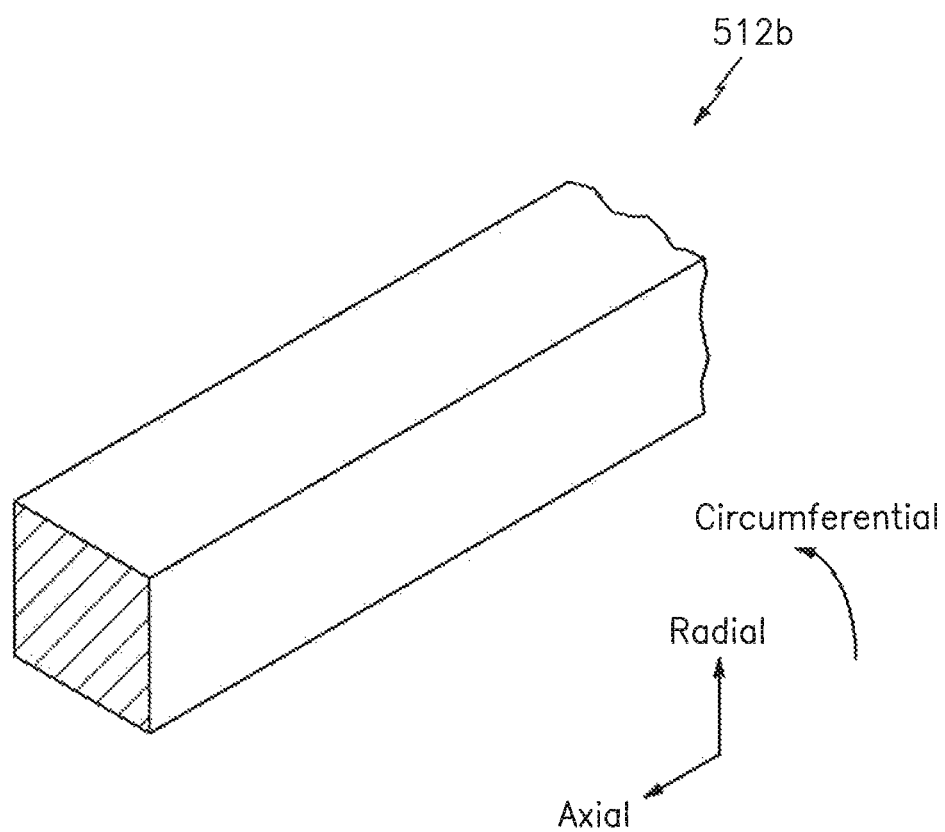

A centering spring beam that is used in a given embodiment may have various shapes. For example. FIG. 5A illustrates a beam 512a that may be cylindrical/circular in cross-section. FIG. 5B illustrates a beam 512b that may be rectangular/square in cross-section. The cylindrical shape of FIG. 5A may be optimal in terms of reducing an amount of stress imposed on the centering spring beam (or beam(s)) for a given amount/degree of engine (e.g., bearing assembly) deflection that is accommodated. The rectangular shape of FIG. 5B may be optimal in terms of ease of manufacture. Other shapes (or combinations of shapes) may be used in some embodiments.

Centering spring beams in accordance with aspects of this disclosure may be manufactured of one or more materials. A centering spring beam may include a metal material, such as for example steel or titanium. Centering spring beams of this disclosure may be manufactured in accordance with one or more manufacturing techniques, such as for example turning and milling of a bar, forging, additive manufacturing, etc. A centering spring beam may be manufactured as a stand-alone component or may be manufactured as an integral part of one or more other components (e.g., a bearing assembly).

Aspects of the disclosure are directed to a centering spring beam that accommodates a deflection (e.g., a radially-oriented deflection) between two or more components, such as for example a bearing assembly and a housing (e.g., a stationary housing). A centering spring beam may use/include one or more spiral-shaped beams. Each beam may include one or more loops. The use of a spiral-shaped beam may provide a longer beam (relative to a unidirectional oriented beam), thereby reducing stress for the same amount of deflection accommodated. A reduction in stress means that a centering spring of this disclosure may be made smaller than a conventional centering spring, resulting in weight and space savings.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A bearing support assembly comprising:
a bearing assembly;
a housing; and
a centering spring coupled to the bearing assembly and the housing,
wherein the centering spring includes a plurality of spiral beams, and
wherein a first of the plurality of spiral beams is defined by a first end and a second end, the first end and the second end corresponding to a first circumferential location that is defined relative to a longitudinal centerline of the bearing support assembly.

2. The bearing support assembly of claim 1, wherein at least one beam of the plurality of spiral beams includes at least one loop.

3. The bearing support assembly of claim 1, wherein the plurality of spiral beams includes at least three spiral beams.

4. The bearing support assembly of claim 1, wherein a second of the plurality of spiral beams is defined by a third end and a fourth end, the third end and the fourth end corresponding to a second circumferential location that is defined relative to the longitudinal centerline of the bearing support assembly.

5. The bearing support assembly of claim 4, wherein the first circumferential location is offset from the second circumferential location.

6. A gas turbine engine comprising:
a rotatable shaft; and
a bearing support assembly coupled to the shaft, the bearing support assembly including
a bearing assembly;
a housing; and
a centering spring coupled to the bearing assembly and the housing,
wherein the centering spring includes a plurality of beams,
wherein a first of the plurality of beams is spiral-shaped, and
wherein the bearing support assembly is defined about a longitudinal centerline, and wherein the first of the plurality of beams is defined by a first end and a second end, and wherein the first end and the second end correspond to a first circumferential location that is defined relative to the longitudinal centerline.

7. The gas turbine engine of claim 6, wherein each of the plurality of beams is spiral-shaped.

8. The gas turbine engine of claim 6, wherein a second of the plurality of beams is defined by a third end and a fourth end, and wherein the third end and the fourth end correspond to a second circumferential location that is defined relative to the longitudinal centerline.

9. The gas turbine engine of claim 8, wherein a third of the plurality of beams is defined by a fifth end and a sixth end, and wherein the fifth end and the sixth end correspond to a third circumferential location that is defined relative to the longitudinal centerline.

10. The gas turbine engine of claim 9, wherein the first circumferential location, the second circumferential location, and the third circumferential location are different circumferential locations.

11. The gas turbine engine of claim 10, wherein the first circumferential location is offset from the second circumferential location by one-hundred twenty degrees, and wherein the second circumferential location is offset from the third circumferential location by one-hundred twenty degrees, and wherein the third circumferential location is offset from the first circumferential location by one-hundred twenty degrees.

12. The gas turbine engine of claim 6, wherein the first end corresponds to a first axial location relative to the longitudinal centerline, and the second end corresponds to a second axial location relative to the longitudinal centerline that is different from the first axial location.

13. The gas turbine engine of claim 6, wherein a second of the plurality of beams is circular in cross-section.

14. The gas turbine engine of claim 6, wherein a second of the plurality of beams is rectangular in cross-section.

* * * * *